Oct. 11, 1932.  J. H. TAYLOR  1,881,979
PIPE FITTING FOR WELDING
Filed June 8, 1931
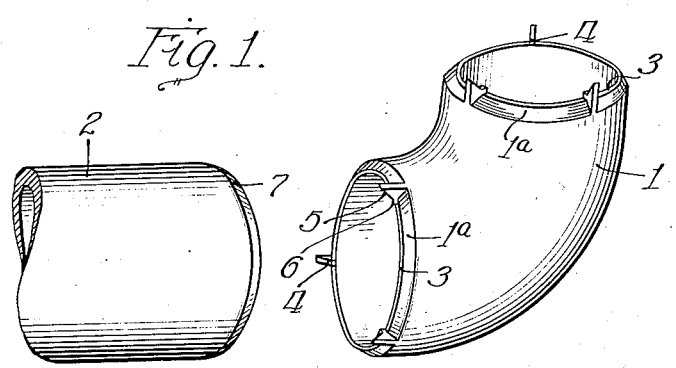
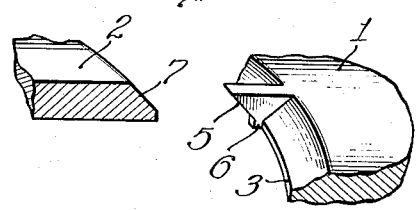
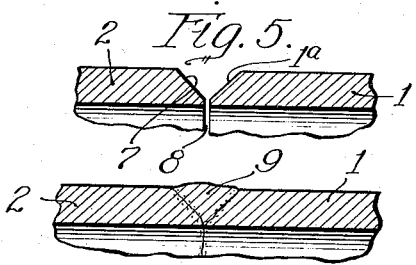
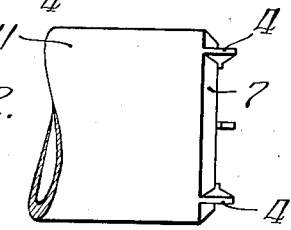
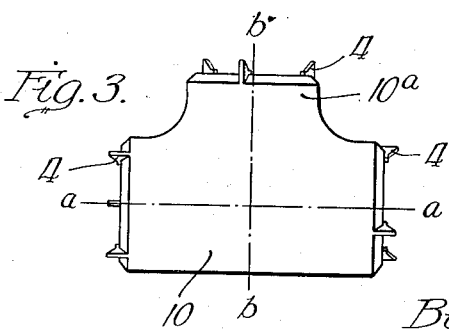
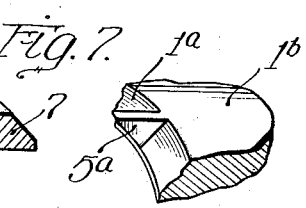
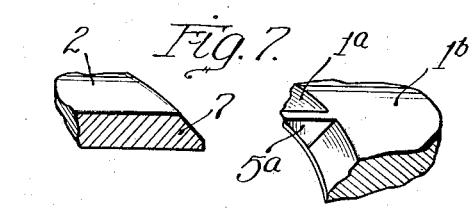
Inventor:
James Hall Taylor
By: Brown, Jackson, Boettcher & Dienner,
Attys Patented Oct. 11, 1932

1,881,979

UNITED STATES PATENT OFFICE

JAMES HALL TAYLOR, OF OAK PARK, ILLINOIS

PIPE FITTING FOR WELDING

Application filed June 8, 1931. Serial No. 542,841.

This invention relates to pipe fittings and analogous articles, and has to do more particularly with fittings adapted to be welded to pipe ends or to other fittings.

One of the main objects of my invention is to provide pipe fittings and the like having means for accurately centering the fitting relative to a pipe end when applied thereto, for facilitating the welding operation. A further object is to provide means whereby the pipe end and the end of the fitting applied thereto are spaced a proper distance apart, when initially positioned in endwise relation, to prevent objectionable stresses being set up incident to expansion caused by the welding operation. Further objects and advantages of my invention will appear from the detail description.

In the drawing:—

Figure 1 is a perspective view of a pipe end and a fitting to be welded thereto, disassembled, in accordance with my invention;

Figure 2 is a side view of a pipe end in accordance with my invention;

Figure 3 is a side view of a T connection or fitting in accordance with my invention;

Figure 4 is a fragmentary view, partly in section, of a pipe end and fitting in accordance with my invention, disassembled;

Figure 5 is a fragmentary sectional view of the pipe end and the fittings of Figure 4 disposed for welding;

Figure 6 is a fragmentary sectional view through the pipe end and the fitting after welding together thereof;

Figure 7 is a view similar to Figure 4 illustrating a modified form of my invention; and Figure 8 is an end view of an elbow and a short straight fitting, in accordance with my invention, applied thereto preparatory to welding.

In Figure 1 I have illustrated an elbow 1 constructed in accordance with my invention, and a pipe end 2 to which the elbow is to be welded. The wall of the elbow, at each end thereof, is beveled from its outer surface inwardly toward the adjacent end of the elbow, at 1a. This bevel terminates short of the inner surface of the elbow so as to leave at each end thereof a surface 3 which is normal to the end portion of the elbow. Three lugs 4 project outwardly beyond each end of the elbow, and from the beveled portion 1a thereof. These lugs are approximately V-shaped and have their outer ends beveled oppositely to the beveled portion 1a of the elbow, as indicated at 5. The outer surface of the lug is flush with the outer surface of the elbow and each lug is provided with a spacing element 6 which projects inwardly across the flat or straight surface 3 of the end of the elbow. The lugs are preferably equally spaced about the end of the elbow and serve as guide and centering members for centering the end of the elbow relative to the pipe end 2. The end of pipe 2 is beveled at 7 in the same manner as the ends of the elbow so that, when the elbow and the pipe are disposed in endwise relation, as in Figure 5, the beveled surfaces 1a and 7 thereof define a trough-like depression extending above the juncture between these members.

The guide lugs 5 serve to center the pipe end and the end of the elbow by the act of disposing these two members in juxtaposed and endwise relation, and the elements 6 serve to space the end of the elbow a short distance from the adjacent end of the pipe, as shown at 8 in Figure 5. After the ends of the elbow and the pipe have been thus positioned, the lugs serve to hold the pipe end and the elbow end in proper centered relation during the welding operation. These members are then welded together in a known manner, so as to form a tight joint between the pipe and the elbow, the metal which has been welded in being indicated at 9 in Figure 6. The welding operation is greatly facilitated by the action of the lugs in accurately centering the pipe end and the elbow end and holding these ends in centered relation during the welding operation. As the welding progresses, the lugs may be fused into the metal of the weld and become an integral part thereof. Preliminary to welding the parts together, the adjacent end portions of the pipe and the elbow are heated in a known manner and the spacing apart of the ends of the pipe and the elbow, by means of the elements 6, is highly efficient in avoiding undesirable stresses incident to this preliminary heating.

While I preferably provide the lugs 5 with the spacing elements 6, this is not essential in all cases and the spacing elements may be omitted. This is illustrated in Figure 7, in which I have shown a lug 5a applied to the end of a fitting 1b, this lug not being provided with a spacing element. In this form of my invention, the bevel at the outer end of the lugs may be made somewhat different from the bevel of the pipe end, so that the lugs act to space the pipe end from the end of the fitting. In the form illustrated in Figures 1 to 6, inclusive, the bevel 5 at the outer end of the lug preferably corresponds approximately to the bevel 7 of the pipe end 2.

In Figure 3 of the drawing I have illustrated my invention as applied to a T 10. While my invention is particularly adapted for use with pipe fittings, it can also be applied to pipe ends to advantage. This is illustrated in Figure 2, in which I have shown a pipe end 11 beveled at 7 and having spacing and centering lugs 4 applied thereto. It will be understood, therefore, that when I refer to pipe fittings in the specification and appended claims, I intend thereby to include pipe ends as well as pipe fittings proper.

In applying a fitting to a pipe end or to another fitting, it is the common practice to dispose these members either in parallel relation or at right angles to each other. The planes of the axes of the two members when thus relatively disposed constitute what is known in the art as the center lines of the fitting. In example, in Figure 3, the line a—a would be the horizontal center line of the body portion of the T fitting 10, and a line at each end of the fitting perpendicular to line a—a would be the vertical center line of the end of the fitting. Line b—b is the vertical center line of neck 10a of fitting 10 and a line perpendicular to line b—b would be the other center line of neck 10a. In order that the fitting may be applied to pipe ends or to other fittings in the usual manner above referred to, and to accommodate variations in the angular relation between the fittings or the pipe ends when applied, the centering and guide lugs are preferably so disposed that the lugs at one end of the fitting at least are not on the center line thereof and are out of alignment with the lugs at the other end of the fitting.

In Figure 8 I have shown a short straight fitting 12, which may be considered as a length of pipe, applied to an elbow 1. It will be noted that the lugs 4a at the near end of the fitting 12 are so disposed that none of these lugs fall upon either of the center lines c—c and d—d of the fitting. On the other hand, one of the lugs 4b at the far end of the fitting 12 falls upon the center line d—d but neither of the other two lugs 4b falls upon either of the center lines. One of the lugs 4 at the lower end of the elbow 1 falls upon the center line c—c but neither of the other two lugs at the lower end of the elbow falls upon either of the center lines. It will also be noted that none of the lugs 4 at the upper end of the elbow 1 fall upon either of the center lines thereof. By arranging the lugs in this manner upon the fittings, a fitting may be applied to a pipe end or to another fitting in the ordinary manner as above set forth, and no interference by the lugs to the desired positioning of the fitting is encountered. Also, the lugs disposed in this manner permit of a wide variation in the angular relation between a fitting and a pipe end or another fitting applied thereto.

What I claim is:—

1. As a new article of manufacture, a pipe fitting adapted to be welded to a pipe beveled end, said fitting having the wall at one end thereof beveled from its outer surface inwardly toward said end and being provided with guide lugs projecting from the beveled surface of said end and having their outer ends beveled oppositely to the beveled end of the fitting, said lugs being disposed to contact the end of the pipe and center the fitting relative to the pipe end.

2. As a new article of manufacture, a pipe fitting adapted to be welded to a beveled pipe end, and said fitting having the wall at one end thereof beveled from its outer surface inwardly toward said end and being provided with guide lugs projecting from the beveled surface of said end and having their outer ends beveled oppositely to the beveled end of the fitting, said lugs being disposed to extend between the end of the fitting and the end of the pipe and in abutting relation to the latter to center the fitting relative to the pipe end and being provided with elements projecting inwardly of the fitting and disposed to extend between the end of the fitting and the end of the pipe and space the fitting from the pipe end.

3. As a new article of manufacture, a pipe fitting adapted to be welded to a beveled pipe end, said fitting having the wall at one end thereof beveled and being provided with guide lugs projecting from the beveled portion and having their outer ends beveled oppositely to the end of the fitting, said lugs being disposed within the periphery of the end of the fitting and to extend between the end of the pipe and the end of the fitting to center the end of the fitting relative to the pipe end.

In witness whereof, I hereunto subscribe my name this 4th day of June, 1931.

JAMES HALL TAYLOR.